Nov. 25, 1969  S. FARIA ET AL  3,480,819
PHOSPHOR COATED HIGH PRESSURE ELECTRIC DISCHARGE DEVICE
Filed Nov. 22, 1967
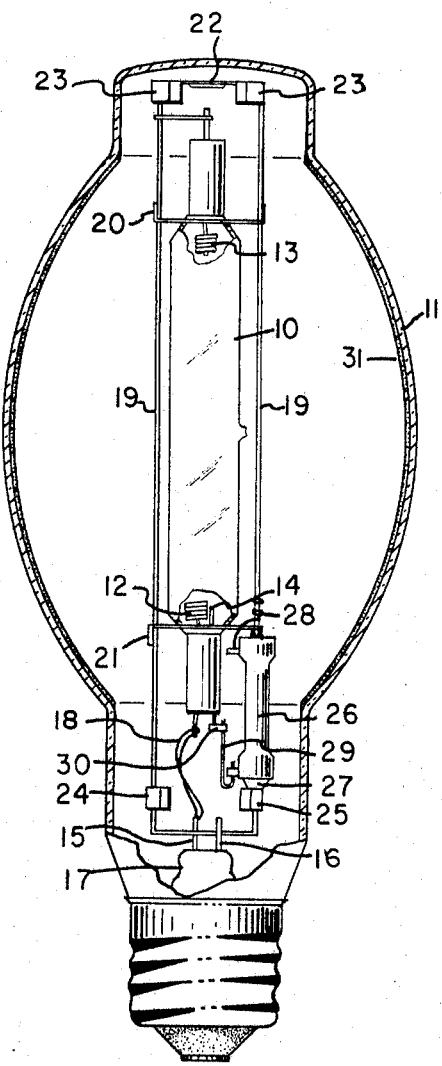
SIXDENIEL FARIA
EMIL J. MEHALCHICK
*INVENTORS*
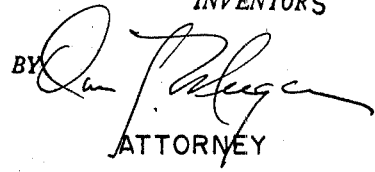
ATTORNEY

United States Patent Office 3,480,819
Patented Nov. 25, 1969

3,480,819
PHOSPHOR COATED HIGH PRESSURE ELECTRIC DISCHARGE DEVICE
Sixdeniel Faria and Emil J. Mehalchick, Towanda, Pa., assignors to Sylvania Electric Products, Inc., a corporation of Delaware
Filed Nov. 22, 1967, Ser. No. 685,139
Int. Cl. H01j *1/62, 63/04*
U.S. Cl. 313—109                                  9 Claims

ABSTRACT OF THE DISCLOSURE

A high pressure electric discharge device having a coating of terbium doped, europium activated yttrium vanadate phosphor disposed upon the inner surface of the outer bulbous envelope. The coating improves the red rendition of the device.

BACKGROUND OF THE INVENTION

Field of the invention

This invention relates to high pressure electric discharge devices, commonly called mercury lamps, and to improve phosphors for such devices.

Description of the prior art

Mercury lamps have strong emission lines in the blue, green and yellow regions but are lacking in substantial red emission. Unless corrected for this deficiency, the light produced by the lamps distorted the true colors of many objects, thereby rendering them unsuitable for applications where good color rendition is necessary. Mercury lamps, however, are excellent emitters of ultraviolet radiation and therefore a number of phosphors have been developed to take advantage of this emission. The phosphors which are used characteristically emit in the red region and are readily excited by ultraviolet light principally at 3650 A. For efficient emission, the phosphors are coated upon the inner surface of a transparent bulbous envelope which surrounds an arc tube discharge source.

For example, a commonly used phosphor is magnesium fluorogermanate which emits in the red region and, together with the mercury emission, provides an overall balance of color. More recently developed is yttrium vanadate activated by europium.

SUMMARY OF THE INVENTION

According to the present invention, we have discovered that the efficiency and red emission of phosphor coatings on mercury lamps can be improved by adding a small quantity of terbium, generally in the range of 50 to 750 p.p.m., to the europium activated yttrium vanadate phosphor matrix. Terbium appears to act as a sensitizer for the europium activation of the phosphors and thereby enhances the emission.

According to the present invention, we have discovered that a mercury lamp having a coating of yttrium vanadate activated by trivalent europium and containing certain quantities of terbium in the matrix, will produce an excellent red rendition with optimum brightness. To be a suitable phosphor for mercury lamps, not only must the materials be responsive to the principal emission lines of the high pressure mercury discharge, but also the emission must be not substantially adversely affected by high operating temperatures. That is, since the outer bulbous envelopes of mercury lamps operate at temperatures in the range of 200 to 350° C., there should be no substantial diminution of the emission of the phosphor at such temperatures.

Quite surprisingly, we have discovered that terbium doping of the europium activated yttrium phosphor produces results not attained by doping the phosphor with other rare earth metals. In Table I following, the effects of doping this phosphor with various other rare earth metals are shown. Lamps using the various rare earth metal dopants were fabricated and the brightness was compared to a standard of yttrium vanadate activated by europium which was equated to 100, both in brightness and percent red. In each case, the terbium dopings were better than the other rare earth metal dopings because of either brightness (LPW), percent red or maintenance (comparison) of the 0 and 100 hours, LPW readings.

TABLE I

| Sample | Rare Earth | 0 hrs. LPW | 0 hrs. Percent Red | 100 hrs. LPW | 100 hrs. Percent Red |
|---|---|---|---|---|---|
| Standard | None | 100.0 | 100.0 | 100.0 | 100.0 |
| A | 100 p.p.m. Tb | 102.0 | 124.0 | 100.0 | 123.0 |
| B | 500 p.p.m. Tb | 102.5 | 121.0 | 101.5 | 120.0 |
| C | 100 p.p.m. Sm | 98.4 | 101.2 | 99.2 | 104.0 |
| D | 500 p.p.m. Sm | 98.5 | 106.0 | 97.8 | 106.5 |
| E | 100 p.p.m. Gd | 96.7 | 104.0 | 98.2 | 109.0 |
| F | 500 p.p.m. Gd | 98.9 | 106.0 | 100.0 | 106.0 |
| G | 100 p.p.m. Pr | 101.2 | 118.0 | 100.0 | 115.0 |
| H | 500 p.p.m. Pr | 101.3 | 116.0 | 99.6 | 113.0 |
| I | 100 p.p.m. Dy | 100.0 | 97.0 | 99.6 | 86.0 |
| J | 300 p.p.m. Dy | 99.7 | 97.0 | 100.0 | 95.7 |

As seen from Table I above, of the rare earth metal activators, only terbium dopings produce enhanced results. While gadolinium and samarium, for example, increase the red rendition, the brightness of the lamp is reduced. Praseodymium also increases the red rendition, but the increase in brightness (LPW) is negligible. From the data, dysprosium produces diminished red rendition and the brightness is not enhanced.

Europium activator concentration also has a marked effect on the red rendition and the brightness of the lamp. In the following Table II, each sample of yttrium vanadate was prepared with various quantities of europium. The various phosphors were doped with 500 p.p.m. of terbium which remained constant.

TABLE II

| Sample No.: | Eu Content, mole percent | LPW | Percent Red |
|---|---|---|---|
| A | 1 | 93.2 | 91.7 |
| B | 2 | 99.8 | 97.8 |
| C | 3 | 99.2 | 100.3 |
| D | 4 | 100.0 | 97.2 |
| E | 5 | 100.0 | 100.0 |
| F | 6 | 100.0 | 100.0 |
| G | 7 | 99.2 | 101.4 |
| H | 8 | 96.6 | 102.1 |
| I | 9 | 95.2 | 101.0 |
| J | 10 | 96.5 | 103.0 |

As indicated in Table II above, we have discovered that the most effective range of europium content is between about 3 to 7 mole percent, that is $YVO_4:Eu_x$, where $x$ is between about 0.03 to 0.07 gram atoms/mole of $YVO_4$ while still retaining a high lumen output.

The terbium concentration is quite important and we have discovered that between 50 and 750 p.p.m. of terbium should be added to the matrix in order to improve the brightness, percent red and maintenance.

TABLE III.—TERBIUM VARIATION

| Sample No.: | Tb Added, p.p.m. | 0 hrs LPW | 0 hrs Percent Red | 100 hrs LPW | 100 hrs Percent Red |
|---|---|---|---|---|---|
| A | None | 58.9 | 6.44 | 55.2 | 6.52 |
| B | 50 | 60.5 | 7.39 | 56.6 | 6.98 |
| C | 250 | 60.7 | 7.66 | 56.2 | 6.73 |
| D | 500 | 60.8 | 7.68 | 54.7 | 7.02 |
| E | 750 | 60.8 | 7.69 | 56.1 | 7.09 |
| F | 1,000 | 60.7 | 7.45 | 55.0 | 6.72 |

A requirement for phosphors which are to be used in mercury lamps is that their emission be stable at elevated temperatures. Because the mercury lamp arc tube operates at temperatures in the order of 600 to 700° C., the phosphor is warmed substantially during use. We have found, quite surprisingly, that the red emission of the terbium doped phosphor increases when the temperature is elevated. The phosphor tested in Table IV has been excited by radiation at 3650 A., the principal ultraviolet emission line of the mercury lamp. Assuming room temperature emission of 6200 A. emission peak of the phosphor as 100%, the following results were attained.

TABLE IV

| Temperature, ° C. | Percent red emission |
|---|---|
| 25 | 100 |
| 100 | 125 |
| 200 | 241 |
| 300 | 463 |
| 400 | 780 |

In the manufacture of lamps containing the terbium doped trivalent europium activated-yttrium vanadate phosphors, we have discovered that the average particle sizes of the material should be maintained below about 12 microns. Unless such particle sizes are maintained, the brightness and red rendition is markedly reduced as shown in Table V following:

TABLE V

| Sample No.: | Fisher Sub-Sieve Size | LPW | Percent red as a portion of the overall emission of the lamp |
|---|---|---|---|
| A | 9.6$\mu$ | 60.8 | 7.96 |
| B | 10.4 | 62.5 | 8.15 |
| C | 11.1 | 61.5 | 7.68 |
| D | 11.5 | 61.0 | 7.59 |
| E | 11.5 | 61.0 | 7.95 |
| F | 12.5 | 60.5 | 7.54 |
| G | 13.0 | 60.0 | 7.43 |
| H | 14.2 | 59.5 | 7.03 |

BRIEF DESCRIPTION OF THE DRAWING

The drawing is a cross-sectional view of a high pressure electric discharge device containing a coating of our phosphor.

DESCRIPTION OF PREFERRED EMBODIMENTS

Referring to the figure, there is shown a high pressure mercury vapor lamp comprising an arc tube 10 surrounded by a transparent outer envelope 11. The arc tube 10 is provided with main electrodes 12 and 13 at each end and an auxiliary electrode 14 located adjacent main electrode 12. Tube 10 is filled with a minute drop of liquid mercury and a small amount of argon gas as is conventional in the art.

A pair of lead-wires 15 and 16 are introduced into the lamp through a stem press 17, lead-wire 15 being connected to electrode 12 of the arc tube by a metal ribbon 18 and lead-wire 16 being attached to U-shaped support wire 19. The arc tube 10 is supported by collars 20 and 21 which encircle the tube and are secured to the U-shaped wire 19. Wire 19 is reinforced by a plate 22 which bridges the free ends of the wire and is supported by resilient metal fingers 23, 24 and 25 which are attached to the wire and frictionally engage the inner wall of envelope 11. A resistor 26 is seated on an insulator button 27 which, in turn, is supported by metal fingers 25. Lead-wire 28 is wound around and welded to support wire 19 and lead-wire 29 is welded to metal ribbon 30 which is connected to auxiliary electrode 14.

A coating 31 of a phosphor having the formula $YVO_4:Eu_{0.03 \text{ to } 0.07}$ and being doped with 50 to 750 p.p.m. of terbium is coated according to conventional techniques upon the inner surface of the outer bulbous envelope. The average particle size of the phosphor is less than about 12$\mu$. The following specific examples are offered as a further explanation of the properties of the phosphor of our invention and are not intended to be limitative upon the claims.

Example I

To 187 grams of yttrium oxalate add 5.74 grams of europium oxide, 175 grams of ammonium metavanadate, and 0.023 gram of terbium oxide (300 p.p.m. Tb). Blend the raw materials thoroughly in a V-type blender, with intensifier bar for approximately a half-hour.

Place blended material in a Vycor pie plate (uncovered) or boat and fire at 1700° F. for two hours in an electric furnace. Remove from furnace, cool and wash with 10–15% hot sodium hydroxide or potassium hydroxide. Wash with hot water until neutral. Dry at 140° C. overnight and then screen thru 325 mesh. This material when coated in a 400 watt HPMV lamp yielded 61.6 lumens per watt and 8.5% red output at 0 hours as compared to the control (no Tb added) of 54.9 lumens per watt and 4.5% red.

Example II

A highly purified yttrium oxide material was used to determine the effect of Tb. In this instance only 75 parts per million of Tb as terbium oxide was added to yttrium oxide with 75 percent excess ammonium metavanadate and 5 mole percent europium as europium oxide. The blending and firing was carried out as in Example I. Data showed the control to be 4.30% red while the test with 75 p.p.m. was 6.77% red after 100 hours of operation.

Example III

A blend of yttrium oxide lots was used to determine the effect of Tb. In this case 150 p.p.m. Tb as terbium oxide was added to yttrium oxide with 100 percent excess ammonia metavanadate and 5 mole percent europium. Same firing conditions as Example II. Results showed the control to be 56.9 LPW and 5.84% red while the test was 61.3 LPW and 8.44% red.

As many changes could be made in the above construction and many different embodiments could be made without departing from the scope thereof, it is intended that all matter contained in the above description or shown in the accompanying drawing shall be interpreted as illustrative and not in a limiting sense.

As our invention, we claim:
1. A terbium doped europium activated yttrium vanadate phosphor.
2. The phosphor of claim 1 wherein said europium is trivalent.
3. The phosphor of claim 2 wherein said europium is present in quantities between about 0.03 and 0.07 gram atoms per mole of yttrium vanadate.
4. The phosphor of claim 3 wherein said terbium is present in quantities between about 50 and 750 parts per million of yttrium vanadate.
5. A high-pressure mercury lamp comprising:
 (a) a mercury filled discharge tube,
 (b) a transparent outer envelope surrounding said discharge tube and spaced therefrom, and
 (c) a red emitting coating of termium doped, europium activated yttrium vanadate disposed on the inside surface of said outer envelope.

6. The lamp according to claim 5 wherein said terbium is present in concentrations of 50 to 750 parts per million of yttrium vanadate.

7. The lamp according to claim 5 wherein the average particle size of the phosphor is less than about 12 microns.

8. The lamp according to claim 5 wherein the europium concentration is between about 3 to 7 mole percent.

9. The lamp according to claim 5 wherein the europium is in the trivalent activation state.

References Cited

UNITED STATES PATENTS

Re. 26,184  4/1967  Ballman et al. _____ 252—301.4

JAMES W. LAWRENCE, Primary Examiner

R. A. HOSSFELD, Assistant Examiner

U.S. Cl. X.R.

252—301.4; 313—108, 184